United States Patent
Yokoi

(10) Patent No.: US 10,907,566 B2
(45) Date of Patent: Feb. 2, 2021

(54) CONTROL DEVICE FOR INTERNAL COMBUSTION ENGINE

(71) Applicant: DENSO CORPORATION, Kariya (JP)

(72) Inventor: Masahiro Yokoi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/270,776

(22) Filed: Feb. 8, 2019

(65) Prior Publication Data

US 2019/0170080 A1 Jun. 6, 2019

Related U.S. Application Data

(63) Continuation of application No. PCT/JP2017/040964, filed on Nov. 14, 2017.

(30) Foreign Application Priority Data

Nov. 24, 2016 (JP) ................. 2016-228177

(51) Int. Cl.
*F02D 41/38* (2006.01)
*F02D 41/04* (2006.01)
(Continued)

(52) U.S. Cl.
CPC .......... *F02D 41/38* (2013.01); *F01N 3/0253* (2013.01); *F01N 3/20* (2013.01); *F01N 11/00* (2013.01); *F02D 41/0062* (2013.01); *F02D 41/0245* (2013.01); *F02D 41/04* (2013.01); *F02D 41/145* (2013.01); *F02D 41/1444* (2013.01);
(Continued)

(58) Field of Classification Search
CPC .... F02D 41/38; F02D 41/0062; F02D 41/402; F02D 41/145; F02D 41/0245; F02D 41/1444; F02D 41/04; F02D 2041/001; F02D 41/3818; F02D 2250/34; F02D 2200/0614; F02D 2200/0602; F02D 2041/389; F01N 3/0253; F01N 3/20; F01N 11/00; F01N 2900/1602; F01N 2900/1406;
(Continued)

(56) References Cited

U.S. PATENT DOCUMENTS

2003/0159441 A1* 8/2003 Kim ................. F02B 37/18
60/608
2005/0022755 A1* 2/2005 Hitomi ................. F01L 1/185
123/58.8
(Continued)

FOREIGN PATENT DOCUMENTS

JP 2004-183581 7/2004
JP 2005-307804 11/2005
(Continued)

*Primary Examiner* — Joseph J Dallo
(74) *Attorney, Agent, or Firm* — Nixon & Vanderhye PC

(57) ABSTRACT

A fuel injection valve is for injecting fuel to cause combustion in an internal combustion engine. An injection rate adjuster is for adjusting an injection rate of the fuel injected by the fuel injection valve. A control device for the internal combustion engine includes a signal generator, and an outputter. The signal generator generates a command signal to cause the injection rate adjuster to adjust the injection rate based on a parameter, which is to estimate an internal EGR amount in which a part of exhaust gas remains in a cylinder. The outputter outputs the command signal to the injection rate adjuster.

18 Claims, 5 Drawing Sheets

(51) Int. Cl.
*F02D 41/14* (2006.01)
*F02D 41/02* (2006.01)
*F01N 11/00* (2006.01)
*F01N 3/20* (2006.01)
*F02D 41/40* (2006.01)
*F02D 41/00* (2006.01)
*F01N 3/025* (2006.01)

(52) U.S. Cl.
CPC ........ *F02D 41/402* (2013.01); *F01N 2430/06* (2013.01); *F01N 2560/06* (2013.01); *F01N 2560/08* (2013.01); *F01N 2900/1404* (2013.01); *F01N 2900/1406* (2013.01); *F01N 2900/1602* (2013.01); *F02D 41/3818* (2013.01); *F02D 2041/001* (2013.01); *F02D 2041/389* (2013.01); *F02D 2200/0602* (2013.01); *F02D 2200/0614* (2013.01); *F02D 2250/34* (2013.01)

(58) Field of Classification Search
CPC ............. F01N 2560/08; F01N 2560/06; F01N 2900/1404; F01N 2430/06
See application file for complete search history.

(56) References Cited

U.S. PATENT DOCUMENTS

| | | | |
|---|---|---|---|
| 2012/0097126 A1 | 4/2012 | Kumano et al. | |
| 2012/0125289 A1* | 5/2012 | Mori ................ | F02M 35/10177 123/430 |
| 2013/0110377 A1* | 5/2013 | Sukegawa ........... | F02D 41/0062 701/103 |
| 2015/0136070 A1* | 5/2015 | Matsushima ........... | F02P 5/045 123/294 |

FOREIGN PATENT DOCUMENTS

| | | |
|---|---|---|
| JP | 2007-32353 | 2/2007 |
| JP | 2012-255366 | 12/2012 |

* cited by examiner

CONTROL DEVICE FOR INTERNAL COMBUSTION ENGINE

CROSS REFERENCE TO RELATED APPLICATION

The present application is a continuation application of International Patent Application No. PCT/JP2017/040964 filed on Nov. 14, 2017, which designated the U.S. and claims the benefit of priority from Japanese Patent Application No. 2016-228177 filed on Nov. 24, 2016. The entire disclosures of all of the above applications are incorporated herein by reference.

TECHNICAL FIELD

The present disclosure relates to a control device for controlling an internal combustion engine.

BACKGROUND

An internal combustion engine of a vehicle has a port injection type configuration in which a fuel is injected into an intake port, and a direct injection type configuration in which the fuel is directly injected into a cylinder. The fuel injected from the fuel injection valve is adjusted in accordance with an operation state of the internal combustion engine.

SUMMARY

According to one aspect of the present disclosure, an internal combustion engine includes a fuel injection valve. A controller is to control an injection rate of fuel by using the fuel injection valve.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
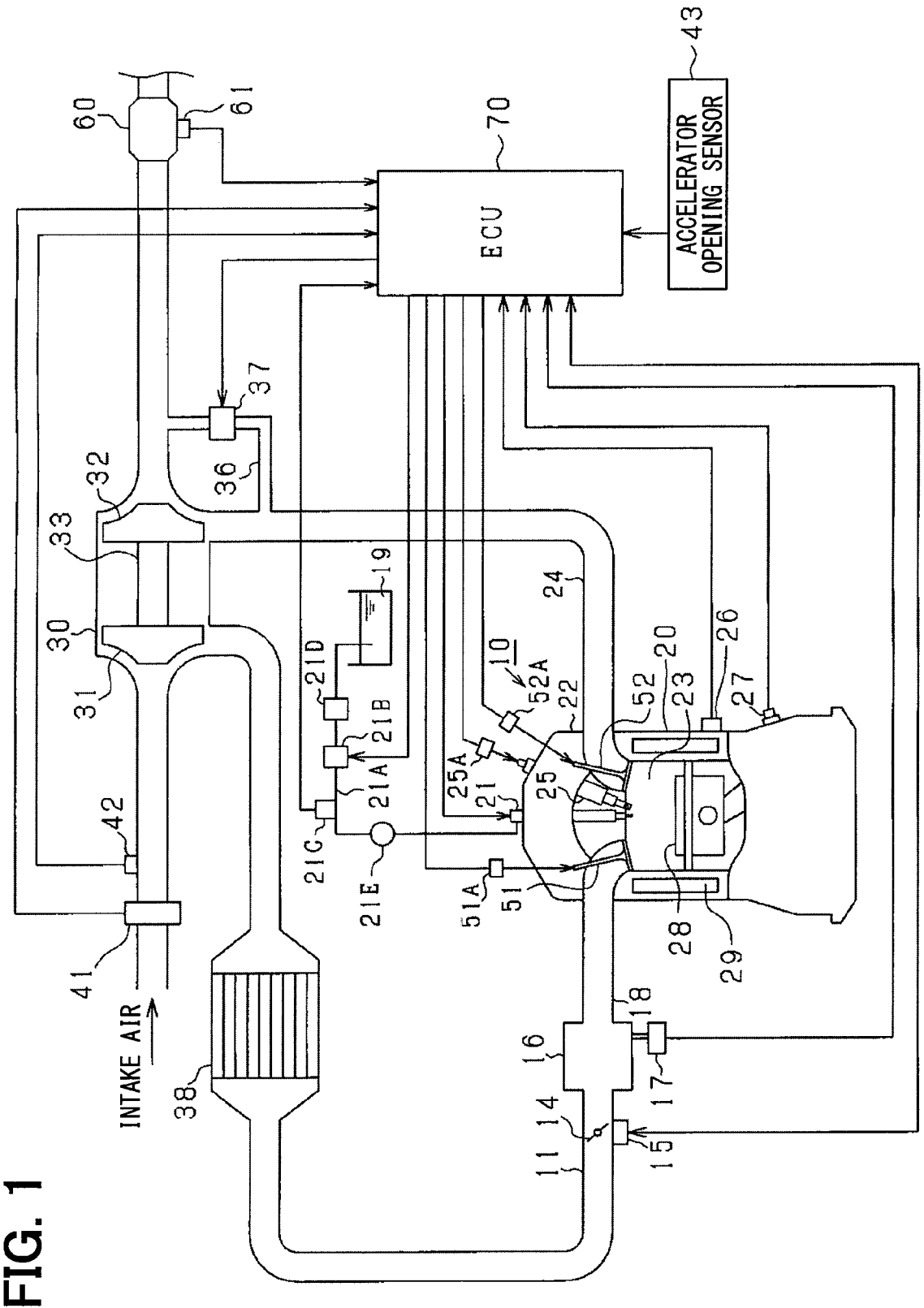
FIG. 1 is a schematic configuration diagram of an engine control system according to the present embodiment.

When a vehicle is traveling at a high altitude, an air pressure decreases, and a pumping loss of an internal combustion engine decreases accordingly. For that reason, as a control device for an internal combustion engine for a vehicle, for example, a configuration is conceivable in which the amount of fuel injected from a fuel injection valve is controlled to be small when the air pressure decreases. However, as the fuel injection amount is smaller, a fuel injection period becomes shorter. If the fuel injection period is shortened, presumably, a linear characteristic (linearity characteristic) between the fuel injection period and the fuel injection amount may not be established, and an error could occur in the fuel injection amount injected by the fuel injection valve. Consequently, this occurrence of error could reduce an accuracy of the output control of the internal combustion engine. As a countermeasure against the above issue for example, a configuration is assumed to perform a control so that the pressure of the fuel to be supplied to the fuel injection valve is lowered more as an atmospheric pressure is lowered more. For example, assuming a situation in which an output loss such as a pumping loss caused during operation of the internal combustion engine is reduced, a configuration may be adopted to perform the control to lower the pressure of the fuel to be supplied to the fuel injection valve. In this way, it is considered that the fuel can be normally injected into a cylinder.

However, an output of the internal combustion engine does is not necessarily varied depending on only the output loss described above. The output of the internal combustion engine is also varied depending on a combustion state of a combustible air-fuel mixture. At that time, it is assumed that a combustion state of the combustible air-fuel mixture is better as an internal exhaust gas recirculation flow rate (internal EGR amount) recirculated in a combustion chamber of the internal combustion engine is smaller, and the output of the internal combustion engine is improved. Therefore, a control method is considered to reduce the fuel injection amount from the fuel injection valve, as the internal EGR amount is smaller. However, in this case, since the fuel injection amount from the fuel injection valve is reduced, the fuel injection period is shortened. As a result, the linearity characteristic between the fuel injection period and the fuel injection amount is not necessarily established, so that there is a concern that an error occurs in the fuel injection amount injected by the fuel injection valve. In consideration of such technical matters, it is conceivable that the combustion state of the combustible air-fuel mixture needs to be considered. In addition, since it may be difficult to directly estimate the internal EGR amount from the atmospheric pressure, there may be a concern that the control for lowering the pressure of the fuel supplied to the fuel injection valve with respect to a change in the internal EGR amount cannot be appropriately performed.

As described above, it is conceivable that the control device for the internal combustion engine is configured to be controllable so that the linearity characteristic between the fuel injection period and the fuel injection amount is established with respect to the change in the internal EGR amount.

In consideration of the above situation, for example, the following configuration may be adopted. More specifically, the internal combustion engine includes a fuel injection valve for injecting a fuel to be combusted by the internal combustion engine, and an injection rate adjuster for adjusting an injection rate of the fuel by the fuel injection valve. The control device for the internal combustion engine includes a signal generator and an outputter. The signal generator generates a command signal to cause the injection rate adjuster to adjust the injection rate based on a parameter enabling to estimate the amount of internal EGR in which a part of the exhaust gas in the cylinder remains. The outputter outputs the command signal generated by the signal generator to the injection rate adjuster.

As the internal EGR amount is smaller, the combustion state of the combustible air-fuel mixture becomes better. Therefore, as the internal EGR amount is smaller, a required injection amount required to be injected into the fuel injection valve becomes smaller. As the required injection amount decreases, the fuel injection period required for injecting the fuel of the required injection amount decreases accordingly. At that time, when the required injection amount is set so that the fuel injection time is shorter as the linearity characteristic between the fuel injection period and the fuel injection amount may not be established, there is a possibility that an error occurs in the fuel injection amount injected by the fuel injection valve, and the accuracy of the output control of the internal combustion engine is lowered.

As a countermeasure against the above situation, the present control device includes a signal generator that generates a command signal to cause the injection rate adjuster to adjust the injection rate based on a parameter enabling to estimate the internal EGR amount. For example, when it is predicted that the internal EGR amount estimated from the parameter is small and the required injection amount is set such that the fuel injection period is shorter as the linearity characteristic between the fuel injection period and the fuel injection amount could not be established, the signal generator generates the command signal so that the injection rate becomes lower than the current injection rate. Subsequently, the outputter outputs the command signal generated by the signal generator to the injection rate adjuster. The injection rate adjuster adjusts the injection rate of the fuel injection valve to be lower than the current injection rate based on the command signal output from the outputter. As a result, the fuel injection period becomes longer, and the fuel injection period can be controlled to have a length at which the linearity characteristic between the fuel injection period and the fuel injection amount is established. Consequently, the fuel injection amount corresponding to the required injection amount can be injected into the fuel injection valve with high accuracy.

Embodiments of the present disclosure will be described below. The present embodiment provides an engine control system for an in-vehicle multi-cylinder gasoline engine which is an internal combustion engine. The engine of the control system is provided with a turbocharger as a supercharger.

FIG. 1 illustrates only one of multiple cylinders included in an engine 10.

A cylinder block 20 configures a main body portion of the engine 10. A combustion chamber 23 and a water jacket 29 are formed inside the cylinder block 20. A combustion chamber 23 accommodates a piston 28 so as to be reciprocally movable. A water jacket 29 defines a space through which a coolant liquid (also referred to as coolant water) can flow, and surrounds the combustion chamber 23.

An intake port and an exhaust port are provided in a cylinder head 22 which is an upper portion of the cylinder block 20. The intake port and the exhaust port are respectively provided with an intake valve 51 and an exhaust valve (exhaust valve) 52.

Each of the intake valve 51 and the exhaust valve 52 is provided with an intake side valve drive mechanism 51A and an exhaust side valve drive mechanism 52A. The intake side valve drive mechanism 51A and the exhaust side valve drive mechanism 52A are valve opening adjustment mechanisms for adjusting the opening and closing timing of the respective valves 51 and 52. Each of the valve drive mechanisms 51A and 52A is a phase change type configuration for adjusting an advance angle amount (phase angle) of each camshaft on the intake side or the exhaust side with respect to a crankshaft of the engine 10. According to the intake side valve drive mechanism 51A, an opening and closing timing of the intake valve 51 is changed so that a valve opening period is changed to an advance side or a retard side. In addition, according to the exhaust side valve drive mechanism 52A, the opening and closing timing of the exhaust valve 52 is changed so that a valve opening period is changed to the advance side or the retard side.

An intake pipe 11 is connected to the intake port. The intake pipe 11 is provided with a throttle valve 14. The opening degree of the throttle valve 14 is adjusted by a throttle actuator 15 such as a DC motor. The throttle actuator 15 incorporates a throttle opening sensor (not illustrated) for detecting the throttle opening degree. A surge tank 16 is provided in the downstream side of the throttle valve 14. The surge tank 16 is provided with an intake air pressure sensor 17 for detecting the intake air pressure on the downstream side of the throttle. An intake manifold 18 for introducing an intake air into the combustion chamber 23 is connected to the surge tank 16.

An exhaust pipe 24 for exhausting an exhaust gas from the cylinder is connected to the exhaust port. The detailed configuration will be described later.

The cylinder head 22 is provided with an in-cylinder injection valve (fuel injection valve) 21. The in-cylinder injection valve 21 is supplied with a high pressure fuel from a high-pressure fuel system. The high-pressure fuel system includes a high-pressure pump (a fuel pressure adjuster and an injection rate adjuster) 21B. The in-cylinder injection valve 21 performs an in-cylinder fuel injection for directly injecting the high-pressure fuel supplied from the high-pressure fuel system into the combustion chamber 23.

A high-pressure fuel system will be briefly described. The system mainly includes a low-pressure pump 21D, a high-pressure pump 21B, and a delivery pipe (pressure accumulation pipe) 21E. The low-pressure pump 21D pumps up the fuel in the fuel tank 19. The high-pressure pump 21B increases the pressure of the low-pressure fuel pumped by the low-pressure pump 21D. The delivery pipe (pressure accumulation pipe) 21E stores the high-pressure fuel discharged from the high-pressure pump 21B. The in-cylinder injection valve 21 is connected to the delivery pipe 21E.

The high-pressure pump 21B is a plunger pump that pressurizes the fuel metered by a metering valve (not shown) and discharges (pumps) the fuel to the outside. In the present embodiment, it is assumed that the metering valve provided in the high-pressure pump 21B is a normally closed electromagnetic solenoid valve. In the metering valve, the valve opening degree is adjusted by the energization of the electromagnetic solenoid, and the fuel suctioned into the high-pressure pump 21B is metered. With the adjustment of the opening degree of the metering valve, the pumping amount of the fuel to the in-cylinder injection valve 21 by the high-pressure pump is adjusted, and the pressure of the fuel supplied to the in-cylinder injection valve 21 is adjusted to a desired pressure.

The low-pressure fuel is increased in pressure by the high-pressure pump 21B. The high-pressure fuel stored in the delivery pipe 21E is injected into the combustion chamber 23 (into the cylinder) by the in-cylinder injection valve 21. A fuel pressure sensor 251C is provided in the high-pressure fuel pipe 21A connecting the high-pressure pump 21B and the delivery pipe 21E. The fuel pressure sensor 21C detects the pressure of fuel (fuel pressure).

An ignition plug 25 is attached to the cylinder head 22 of the engine 10. A high voltage is applied to the ignition plug 25 at a desired ignition timing through an ignition device 25A including an ignition coil or the like. With the application of the high voltage, a discharge spark is generated between opposing electrodes of each ignition plug 25, and an air-fuel mixture in the combustion chamber 23 is ignited to be used for combustion. In the present embodiment, when the engine 10 performs an operation other than the catalyst warming-up operation (normal operation), which will be described later, the ignition device 25A performs ignition discharge in the vicinity of a top dead center in one combustion cycle.

A water temperature sensor 26 and a crank angle sensor 27 are attached to the cylinder block 20 of the engine 10. The water temperature sensor 26 detects a temperature of the engine coolant water. The crank angle sensor 27 outputs a rectangular crank angle signal at every predetermined crank angle (for example, in a cycle of 30° CA) in accordance with the rotation of the engine 10.

A turbocharger (supercharger) 30 is placed between the intake pipe 11 and the exhaust pipe 24. The turbocharger 30 has a compressor impeller (intake compressor) 31 provided in the intake pipe 11 and a turbine wheel (exhaust turbine) 32 provided in the exhaust pipe 24, and those components are connected to each other via a rotation shaft 33. A bypass passage 36 is provided between an upstream portion and a downstream portion of the exhaust pipe 24 across the exhaust turbine 32. A waste gate valve (WGV) 37 is provided in the bypass passage 36. The waste gate valve 37 is opened and closed by driving a WGV actuator, and an opening area of the bypass passage 36, that is, an exhaust gas flow rate flowing through the bypass passage 36 is variably adjusted accordingly.

In the turbocharger 30, the exhaust gas supplied to the exhaust turbine 32 rotates the exhaust turbine 32, and the rotational force is transmitted to the intake compressor 31 via the rotation shaft 33. The intake air flowing in the intake pipe 11 is compressed and supercharged by the intake compressor 31.

The air supercharged by the turbocharger 30 is cooled by the intercooler 38 and then fed to the downstream side of the intercooler 38. Since the intake air is cooled by the intercooler 38, a filling efficiency of the intake air is enhanced.

The intercooler 38 is connected to a radiator through a coolant water passage (not shown), and cools the intake air with a coolant water. The coolant water passage is provided with a switching valve that switches between a state in which the coolant water is supplied to the intercooler 38 and a state in which the coolant water is not supplied to the intercooler 38. The switching valve is switched, thereby being capable of adjusting the flow rate of the coolant water flowing in the intercooler 38.

A catalyst (catalyst device) 60 such as a three-way catalyst for purifying CO, HC, NOx, and the like in exhaust gas, and a catalyst temperature sensor 61 for directly detecting a temperature of the catalyst 60 are provided in the downstream side of the turbocharger 30 in the exhaust pipe 24.

An air flow meter 41 for detecting the intake air amount and an intake air temperature sensor 42 for detecting an intake air temperature of the intake upstream portion are provided on an upstream side of the turbocharger 30 in the intake pipe 11. In addition, in the present control system, an accelerator opening sensor 43 for detecting a depression operation amount of an accelerator pedal (accelerator opening degree) by a driver is provided in the intake pipe 11.

The control system includes an electronic control unit (ECU) 70 which forms a center of engine control. The ECU 70 mainly includes a microcomputer including a CPU, a ROM, a RAM, and the like. The ECU 70 executes control programs for controlling the operations of the respective components including the in-cylinder injection valve 21 and the ignition device 25A, which are stored in the ROM, in accordance with the operation state of the engine 10 acquired based on the outputs of the various sensors such as the crank angle sensor 27. As a result, the ECU 70 performs various controls of the engine 10 in accordance with the engine operation states. For example, as an ignition control, the ECU 70 generates an ignition signal based on engine parameters, and outputs the ignition signal to the ignition device 25A so as to cause the ignition plug 25 to produce a spark.

In addition, the ECU 70 performs a catalyst warming-up operation for promoting a temperature rise of the catalyst 60 when a predetermined catalyst warming-up condition is satisfied. Catalyst warming-up conditions in the present embodiment will be exemplified below. A condition (i) is satisfied when the temperature of the catalyst 60 detected with the catalyst temperature sensor 61 is less than a catalyst activation temperature. A condition (ii) is satisfied when the various sensors (the intake air pressure sensor 17, the water temperature sensor 26, the crank angle sensor 27, the air flow meter 41, the intake air temperature sensor 42, the accelerator opening sensor 43, and the like) are not faulty. A condition (iii) is satisfied when the throttle actuator 15 or the in-cylinder injection valve 21 are not faulty. A condition (iv) is satisfied when the fuel pressure detected with the fuel pressure sensor 21C is controlled to a target fuel pressure set at the time of idle operation after the engine 10 has been started. When all the conditions of (i) to (iv) are satisfied, it is determined that the catalyst warming-up conditions are satisfied.

In the catalyst warming-up operation according to the present embodiment, the ignition timing by the ignition plug 25 is retarded from that in the normal operation described above. As a result, the temperature of the exhaust gas rises, and the warming-up of the catalyst 60 is promoted. However, when the ignition timing is retarded from that in the normal operation, it is assumed that the combustion state of the fuel is deteriorated, and thus the exhaust emission is deteriorated. For that reason, when the catalyst warming-up operation is performed, the in-cylinder injection valve 21 performs a divided injection for executing a pre-stage injection in an intake stroke of the engine 10, and for executing a post-stage injection in a compression stroke. As a result, a weak stratified charge combustion is performed in which a locally rich mixture (weak stratified mixture) is formed around the ignition plug 25 and the weak stratified mixture is ignited by a discharge spark of the ignition plug 25. With the implementation of the divided injection, the adhesion of the injected fuel to a wall surface of the cylinder block 20 or the piston 28 can be reduced, or a fuel spray can be collected around the ignition plug 25, so that a combustion state of the fuel can be stabilized, and hence the exhaust emission can be improved. In the divided injection at the time of catalyst warming-up, the injection may be performed multiple times as the pre-stage injection in the intake stroke, or the injection may be performed multiple times as the post-stage injection in the compression stroke. However, the number of times of fuel injection (hereinafter referred to as the number of divisions) of divided injections performed during the catalyst warming-up operation is a fixed value.

A magnitude of an output of the engine 10 varies depending on a magnitude of an output loss such as a pumping loss caused during the operation of the engine 10 and a combustion state of the combustible air-fuel mixture. In particular, it is assumed that the combustion state of the combustible air-fuel mixture is improved more as the internal exhaust recirculation flow rate (internal EGR amount) recirculating in the combustion chamber 23 is smaller, and the output of the engine 10 is improved. Therefore, a control is performed so that as the internal EGR amount is smaller, the required injection amount required for injection to the in-cylinder injection valve 21 is smaller. As the required injection amount is smaller, the fuel injection period until the in-cylinder injection valve 21 injects the fuel by the amount corresponding to the required injection amount is shorter. The in-cylinder injection valve 21 is required to switch the opening and closing valve quicker as the fuel injection period is shorter. However, since there is an upper limit to an opening and closing switching speed at which the in-cylinder injection valve 21 can be opened and closed at a stable speed, there is a minimum injection period in which the fuel injection amount can be injected with an accuracy higher than a predetermined accuracy depending on the upper limit.

Therefore, when the fuel injection period becomes shorter than the minimum injection period because the required injection amount becomes smaller as the internal EGR amount is small, there is a possibility that an error occurs in the fuel injection amount injected by the in-cylinder injection valve 21, and an accuracy of the output control of the engine 10 could be lowered. In this manner, a situation in which the required injection amount is reduced, the fuel injection period becomes shorter than the minimum injection period. The situation in which an error could occur in the fuel injection amount, by which fuel is injected by the in-cylinder injection valve 21, can be referred to as a situation in which the linearity characteristic between the fuel injection period and the fuel injection amount is not established.

It is assumed that the above-mentioned issue occurs particularly at the time of the catalyst warming-up operation. In the present embodiment, in the catalyst warming-up operation, the in-cylinder injection valve 21 is caused to perform the divided injection. In the divided injection, the required total injection amount of the fuel to be injected during one combustion cycle period is divided into a plurality of injections and injected. At that time, even when the required total injection amount is set to be large, when the divided injection is performed, there is a possibility that the required injection amount is set to be smaller than the lower limit value of the required injection amount (hereinafter referred to as a high precision injection lower limit value) by which the in-cylinder injection valve 21 can control the fuel injection amount with an accuracy higher than the predetermined accuracy with respect to the injection of a certain stage of the divided injections. In other words, the fuel injection period may be shorter than the minimum injection period. In addition, in a situation where the internal EGR amount is small, it is assumed that the required injection amount is set to be further small. Therefore, there is a high possibility that the required injection amount is set to be smaller than the high precision injection lower limit value.

As a countermeasure against the above issue, the ECU 70 according to the present embodiment generates a command signal for adjusting the fuel pressure of the fuel supplied to the in-cylinder injection valve 21 to the high-pressure pump 21B based on a parameter enabling to estimate the internal EGR amount, and outputs the generated command signal to the high-pressure pump 21B. More specifically, the ECU 70 outputs the generated command signal to the metering valve provided in the high-pressure pump 21B. The opening degree of the metering valve is adjusted by the command signal. The ECU 70 corresponds to a signal generator and an outputter. The ECU 70 corresponds to a fuel injection controller, a catalyst warming-up controller, a pressure loss calculator, a pressure ratio setter, a downstream exhaust gas pressure calculator, and a downstream portion exhaust gas pressure calculator.

The parameter enabling to estimate the internal EGR amount is set as a pre-turbine exhaust gas pressure (downstream portion exhaust gas pressure). The pre-turbine exhaust gas pressure is an exhaust gas pressure of exhaust gas flowing in the downstream side of the exhaust valve 52 in the exhaust pipe 24 and the upstream side of the turbocharger 30 (exhaust turbine 32). The internal EGR amount depends largely on the pre-turbine exhaust gas pressure. Therefore, when the pre-turbine exhaust gas pressure is used as a parameter, the internal EGR amount can be calculated more accurately. In the present embodiment, the pre-turbine exhaust gas pressure is estimated. A detailed method of estimating the pre-turbine exhaust gas pressure will be described later.

The required injection amount to be set can be grasped from the internal EGR amount calculated based on the magnitude of the pre-turbine exhaust gas pressure. At that time, when it is assumed that the required injection amount is smaller than the high precision injection lower limit value, the fuel pressure of the fuel supplied to the in-cylinder injection valve 21 is adjusted to be low by the high-pressure pump 21B. As the fuel pressure of the fuel supplied to the in-cylinder injection valve 21 is lower, the fuel injection amount per unit time is smaller, and therefore, the fuel injection period until the fuel of the required injection amount is injected by the in-cylinder injection valve 21 becomes longer. The fuel injection amount per unit time can be defined as an injection rate. Therefore, as the fuel pressure of the fuel supplied to the in-cylinder injection valve 21 is lower, the injection rate of the in-cylinder injection valve 21 becomes lower, and therefore, the fuel injection period until the fuel of the required injection amount is injected by the in-cylinder injection valve 21 becomes longer. In other words, even when the required injection amount is set to be smaller than the high precision injection lower limit value, the fuel pressure of the fuel supplied to the in-cylinder injection valve 21 is controlled to be lower than the current fuel pressure, so that the injection rate is adjusted to be low and the fuel injection period can be controlled to be longer than the minimum injection period. Consequently, the fuel injection amount corresponding to the required injection amount can be injected by the in-cylinder injection valve 21 with an accuracy higher than the predetermined accuracy.

Figure 2:
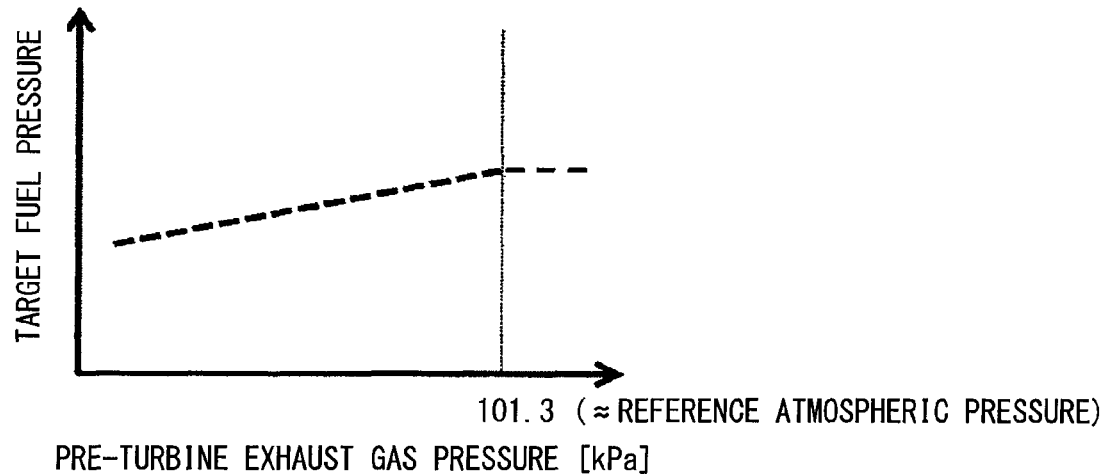
FIG. 2 is a graph showing a relationship between a pre-turbine exhaust gas pressure and a target fuel pressure.
Figure 3:
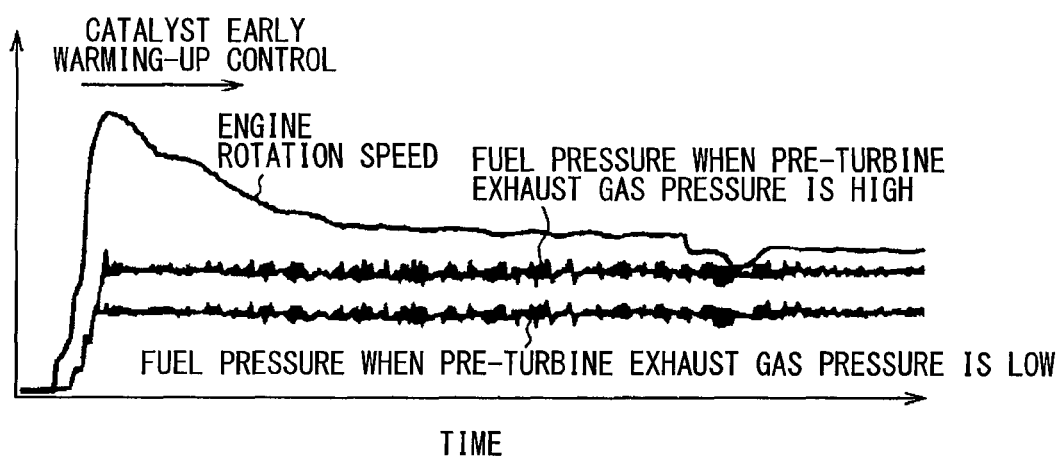
FIG. 3 is a time chart showing how a fuel pressure is controlled when the pre-turbine exhaust gas pressure is high and when the pre-turbine exhaust gas pressure is low.

Therefore, a map showing an optimum target fuel pressure corresponding to the magnitude of the pre-turbine exhaust gas pressure as shown in FIG. 2 is stored in advance in the ECU 70. As a result, during the catalyst warming-up operation, the ECU 70 sets the target fuel pressure from the pre-turbine exhaust gas pressure estimated with reference to the stored map. As a result, as shown in FIG. 3, when the pre-turbine exhaust gas pressure is low during the catalyst warming-up operation, the fuel pressure of the fuel supplied to the in-cylinder injection valve 21 is adjusted to be low by the high-pressure pump 21B as compared with the case in which the pre-turbine exhaust gas pressure is high.

The map shown in FIG. 2 is a map defining a relationship between the pre-turbine exhaust gas pressure and a target fuel pressure based on the target fuel pressure set when the pre-turbine exhaust gas pressure is equal to a reference atmospheric pressure (101.3 kPa). At that time, when the pre-turbine exhaust gas pressure is larger than the reference atmospheric pressure, the required injection amount is set to be larger than that when the pre-turbine exhaust gas pressure is equal to the reference atmospheric pressure, and when the fuel injection period becomes longer. In other words, when the pre-turbine exhaust gas pressure becomes higher than the reference atmospheric pressure, the possibility that the fuel injection period becomes shorter than the minimum injection period is low, and consequently, the possibility that the accuracy of injecting the fuel corresponding to the required injection amount becomes lower than the predetermined accuracy is low. Therefore, there is no need to raise the target fuel pressure when the pre-turbine exhaust gas pressure becomes higher than the reference atmospheric pressure to a level higher than the target fuel pressure set when the pre-turbine exhaust gas pressure is equal to the reference atmospheric pressure. Therefore, in the present embodiment, the target fuel pressure in the case where the pre-turbine exhaust gas pressure is larger than the reference atmospheric pressure is set to be equal to the target fuel pressure set in the case where the pre-turbine exhaust gas pressure is equal to the reference atmospheric pressure.

Figure 4:
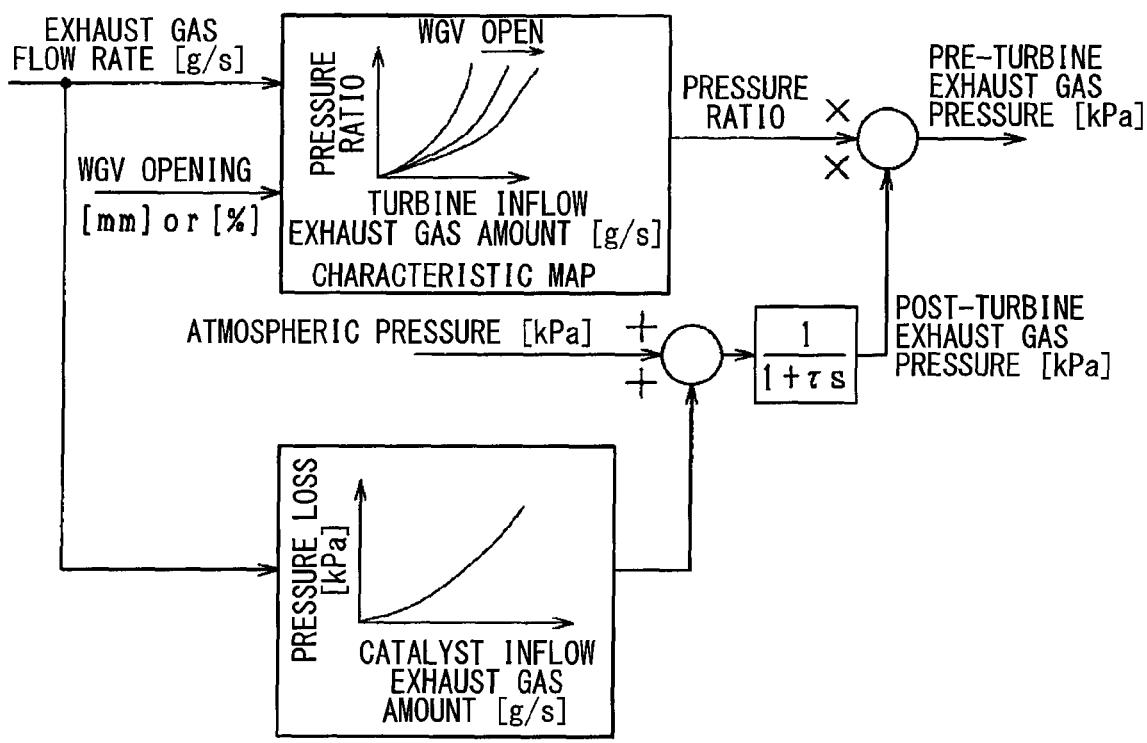
FIG. 4 is a schematic diagram showing a method of estimating the pre-turbine exhaust gas pressure.

A method of estimating the pre-turbine exhaust gas pressure will be described with reference to FIG. 4.

The exhaust gas flowing into the exhaust pipe 24 through the exhaust valve 52 has a pressure loss in the exhaust gas pressure when passing through the exhaust turbine 32, and further has a pressure loss in the exhaust gas pressure when passing through the catalyst 60, and finally has a pressure equivalent to atmospheric pressure. From the above viewpoint, a sum of an absolute value of the pressure loss of the exhaust gas, which is caused when passing through the catalyst 60, and the atmospheric pressure corresponds to a post-turbine exhaust gas pressure (exhaust gas pressure on the downstream side of the supercharger) as a pressure of the exhaust gas flowing in the downstream side of the exhaust turbine 32 and in the upstream side of the catalyst 60.

The pressure loss of the exhaust gas caused when passing through the catalyst 60 has a relationship to increase as the flow rate of the exhaust gas flowing into the catalyst 60 (hereinafter, referred to as a catalyst inflow exhaust gas amount) increases. As shown at a bottom of FIG. 4, a map showing the above relationship is stored in advance in the ECU 70, the ECU 70 can determine the pressure loss of the exhaust gas caused when passing through the catalyst 60 from the catalyst inflow exhaust gas amount by referring to the map. The catalyst inflow exhaust gas amount can be calculated based on the intake air amount detected with the air flow meter 41. However, a slight delay occurs until the air of the intake air amount detected with the air flow meter 41 is exhausted and flows into the catalyst 60. The "delay" causes a time delay until the calculated catalyst inflow exhaust gas amount reaches the current catalyst inflow exhaust gas amount. Therefore, in consideration of the fact that the calculated post-turbine exhaust pressure also causes an error due to an error in the calculated catalyst inflow exhaust gas amount, the calculated post-turbine exhaust gas pressure is smoothed with the use of a smoothing coefficient. This makes it possible to reduce the error caused in the post-turbine exhaust gas pressure.

On the other hand, a pressure ratio of the pre-turbine exhaust gas pressure to the post-turbine exhaust gas pressure (pre-turbine exhaust gas pressure/post-turbine exhaust gas pressure) is found according to the characteristics of the turbocharger 30. The pressure ratio changes in accordance with the turbine inflow exhaust gas amount flowing into the exhaust turbine 32. More specifically, the pressure ratio increases as the turbine inflow exhaust gas amount increases. Further, as the opening degree of the waste gate valve 37 opened by driving the WGV actuator increases, the flow rate of the exhaust gas that does not pass through the exhaust turbine 32 but passes through the bypass passage 36 and flows in the exhaust pipe 24 downstream of the exhaust turbine 32 increases. In other words, as the opening degree of the waste gate valve 37 opened by driving the WGV actuator is larger, the turbine inflow exhaust gas amount becomes smaller. Therefore, in the case where the opening degree of the waste gate valve 37 is larger, as compared with the case where the opening degree of the waste gate valve 37 is smaller, the turbine inflow exhaust gas amount required for achieving a predetermined pressure ratio is larger. In other words, when the turbine inflow exhaust gas amount is kept constant, the pressure ratio becomes smaller as the opening degree of the waste gate valve 37 becomes larger. As described above, as shown in a top of FIG. 4, a map indicating that the pressure ratio is set to be larger as the turbine inflow exhaust gas amount is larger, and the pressure ratio is set to be smaller as the opening degree of the waste gate valve 37 is larger is stored in advance in the ECU 70.

The turbine inflow exhaust gas amount can be calculated based on the intake air amount detected with the air flow meter 41, similarly to the catalyst inflow exhaust gas amount. The turbine inflow exhaust gas amount is not delayed as compared to the catalyst inflow exhaust gas amount with respect to the intake air amount. Therefore, the delay of the turbine inflow exhaust gas amount with respect to the intake air amount is not considered. When the operation state of the internal combustion engine is in a steady state, since the intake air amount and the turbine inflow exhaust gas amount become equal to each other, it can be considered that there is no delay in the catalyst inflow exhaust gas amount with respect to the intake air amount.

The ECU 70 calculates the pre-turbine exhaust gas pressure according to a product of the pressure ratio set by referring to the map based on the turbine inflow exhaust gas amount and the opening degree of the waste gate valve 37 and the calculated post-turbine exhaust gas pressure.

Figure 5:
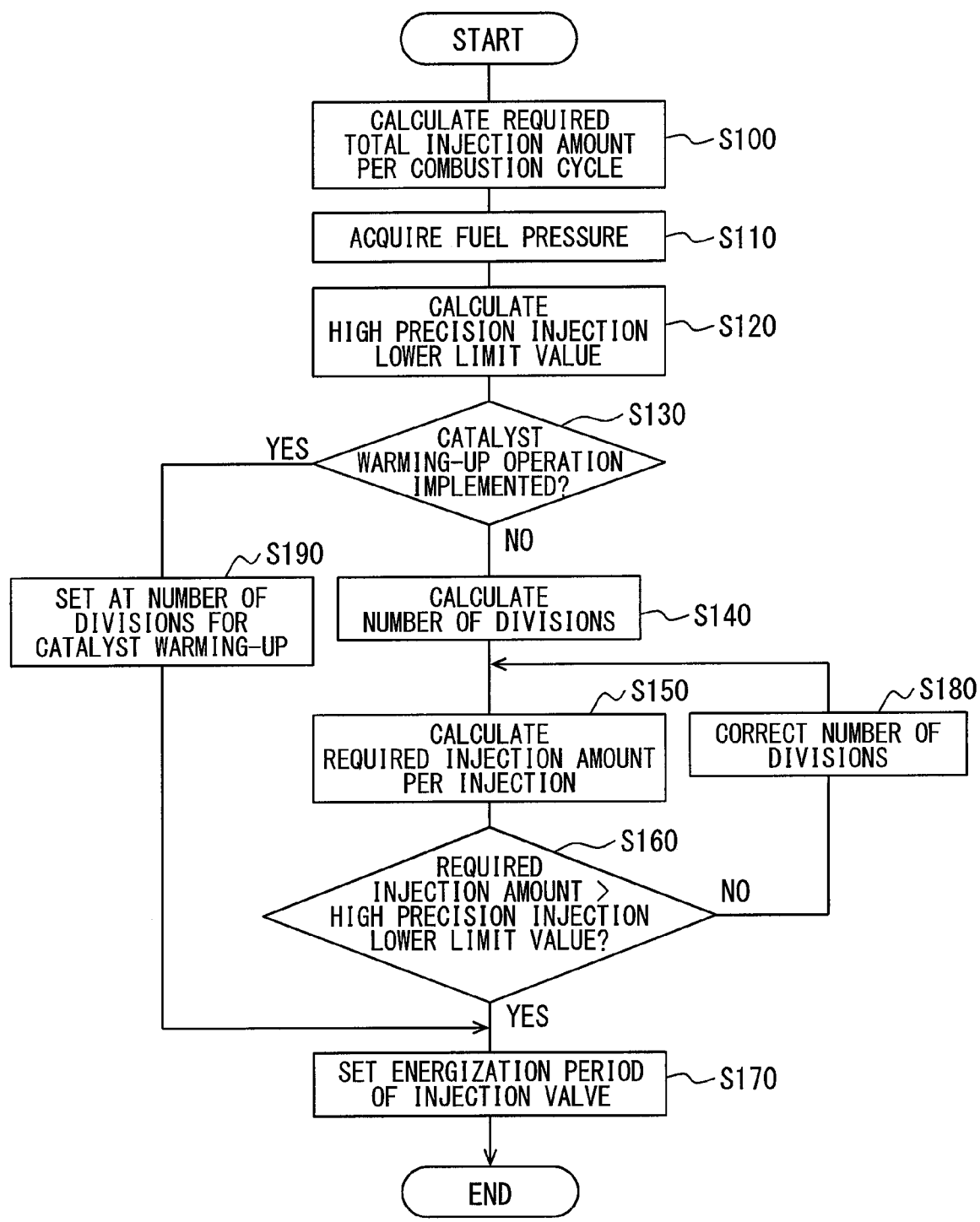
FIG. 5 is a control flowchart executed by an ECU according to the present embodiment.

In the present embodiment, the divided injection control of FIG. 5 is performed by the ECU 70. The divided injection control shown in FIG. 5 is repeatedly performed by the ECU 70 in a predetermined cycle during a period in which the ECU 70 is powered on. Note that the divided injection control shown in FIG. 5 is a control content on the assumption that the divided injection is performed regardless of whether or not the catalyst warming-up operation is performed.

First, in step S100, a required total injection amount of fuel to be injected during one combustion cycle period is calculated based on the intake air amount detected with the air flow meter 41 and the set target air-fuel ratio. The required total injection amount is calculated in consideration of the internal EGR amount, and as the internal EGR amount becomes smaller, the smaller required total injection amount is calculated.

In step S110, the fuel pressure of the fuel flowing through the high-pressure fuel pipe 21A detected with the fuel pressure sensor 21C is acquired. In step S120, the high precision injection lower limit value is calculated based on the fuel pressure acquired in step S110.

In step S130, it is determined whether or not the catalyst warming-up operation is performed by satisfying the catalyst warming-up condition. If it is determined that the catalyst warming-up operation is to be performed (YES in S130), the process proceeds to step S190. In step S190, the number of divisions is set as the number of divisions for catalyst warming-up. Subsequently, the process proceeds to step 170, which will be described later. When it is determined that the catalyst warming-up operation is not to be performed (NO in S130), the process proceeds to step S140.

In step S140, the number of times the fuel injection is performed per combustion cycle, that is, the number of divisions of fuel injection is set based on a rotation speed of the engine 10 detected based on the output signal of the crank angle sensor 27 and the accelerator opening degree (load of the engine 10) detected with the accelerator opening sensor 43. In step S150, the required total injection amount calculated in step S100 is divided by the number of divisions set in step S140 to calculate the required injection amount per injection.

In step S160, it is determined whether or not the required injection amount per injection calculated in step S150 is larger than the high precision injection lower limit value. When it is determined that the required injection amount per injection is larger than the high precision injection lower limit value (YES in S160), the process proceeds to step S170. In step S170, an energization period for opening the in-cylinder injection valve 21 is set based on a valve opening command period of the in-cylinder injection valve 21 per injection, the number of divisions, an injection termination timing of the last injection, and an interval from the end of injection to the execution of the next injection. When it is determined that the required injection amount per injection is not larger than the high precision injection lower limit value (NO in S160), the process proceeds to step S180, the number of divisions set in step S140 is corrected to be smaller, and the process returns to step S150.

Figure 6:
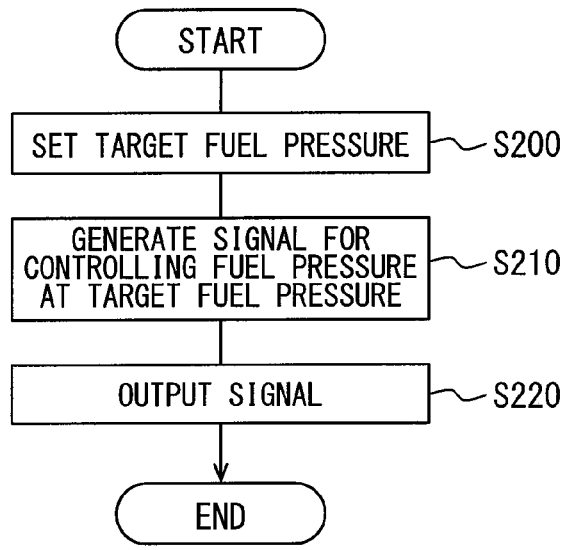
FIG. 6 is a control flowchart executed by the ECU according to the present embodiment.

The high-pressure pumping control shown in FIG. 6 is performed by the ECU 70. The fuel pump control shown in FIG. 6 is repeatedly performed in a predetermined cycle by the ECU 70 during a period in which the divided injection control of FIG. 5 is performed.

First, in step S200, a target fuel pressure is set. In step S210, a command signal is generated so that the fuel pressure of the fuel supplied to the in-cylinder injection valve 21 becomes a target fuel pressure set in step S200. In step S220, the signal generated in step S210 is output to the metering valve provided in the high-pressure pump 21B. Subsequently, the present control is completed.

Figure 7:
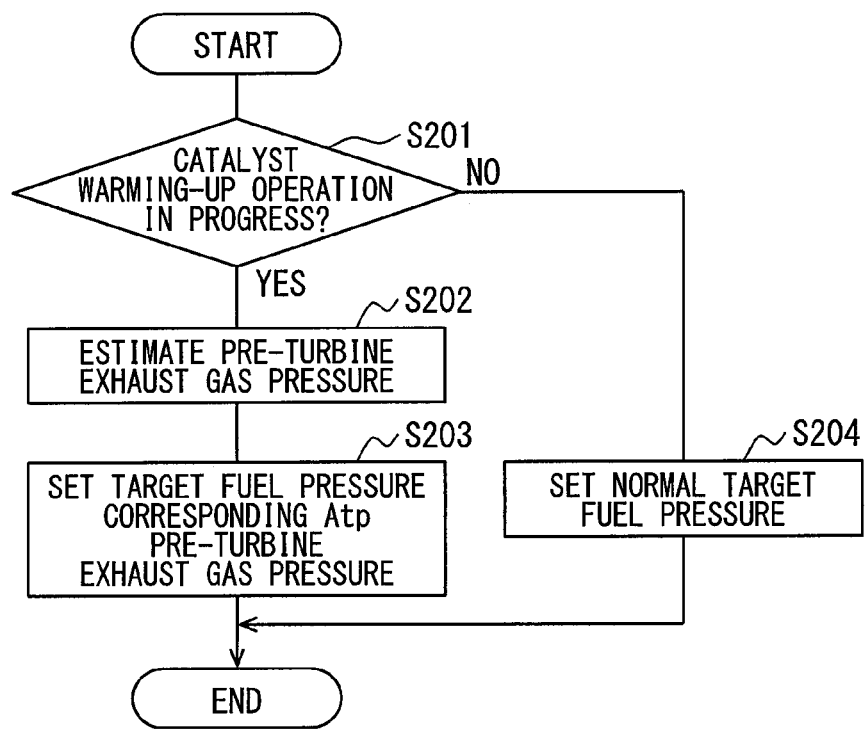
FIG. 7 is a control flowchart of a subroutine process of step S200 shown in FIG. 6.

Further, the target fuel pressure setting process of FIG. 7 is performed by the ECU 70. The target fuel pressure setting process shown in FIG. 7 is a subroutine process corresponding to step S200 shown in FIG. 6.

First, in step S201, it is determined whether or not the catalyst warming-up operation is being performed, based on whether or not the catalyst warming-up condition is satisfied. If it is determined that the catalyst warming-up operation is being performed (NO in S201), the process proceeds to step S204. In step S204, the target fuel pressure during normal operation is set based on the rotation speed of the engine 10 detected based on the output signal of the crank angle sensor 27, a load of the engine 10, and a temperature of the engine coolant water detected with the water temperature sensor 26. Subsequently, the present process is completed.

If it is determined that the catalyst warming-up operation is being performed (YES in S201), the process proceeds to step S202, and the pre-turbine exhaust gas pressure is estimated. In step S203, the target fuel pressure is set in accordance with the pre-turbine exhaust gas pressure estimated in step S202. Subsequently, the present process is completed.

With the above configuration, the present embodiment produces the following effects.

When the divided injection is performed during the catalyst warming-up operation, the command signal is generated by the ECU 70 so that the injection rate of the in-cylinder injection valve 21 becomes smaller than the current injection rate as the pre-turbine exhaust gas pressure becomes lower. The ECU 70 outputs the generated command signal to the metering valve provided in the high-pressure pump 21B. The fuel pressure of the fuel supplied to the in-cylinder injection valve 21 is controlled to be low by the metering valve provided in the high-pressure pump 21B based on the command signal output by the ECU 70. As a result, the injection rate of the in-cylinder injection valve 21 is adjusted to be low. In addition, the fuel injection period can be controlled to be longer than the minimum injection period in any injection stage, and the in-cylinder injection valve 21 is enabled to inject fuel by the fuel injection amount corresponding to the required injection amount with high accuracy.

In the engine 10 without the turbocharger 30, basically, as the atmospheric pressure is higher, the exhaust gas pressure downstream of the exhaust valve is also higher. However, in the engine 10 including the turbocharger 30, since the exhaust gas pressure changes depending on the operation state of the turbocharger 30, it becomes difficult to estimate the pre-turbine exhaust gas pressure from the atmospheric pressure, and consequently, it becomes difficult to estimate the internal EGR amount from the atmospheric pressure. The ECU 70 adjusts the injection rate based on the pre-turbine exhaust gas pressure, which is set as a parameter enabling to estimate the internal EGR amount. Advantageously, the ECU 70 is applied to engines 10 having the above turbocharger 30.

For example, in a port injection engine, a pressure of the fuel supplied to a port injection valve is often low. For that reason, the fuel injection period is hardly set to the required injection amount shorter than the minimum injection period. Therefore, it could be effective to apply the present fuel pressure control to the direct injection type engine 10 in which the pressure of the fuel supplied to the in-cylinder injection valve 21 is higher than that of the port injection type engine and divided injection is performed as necessary.

The above embodiment can be modified and implemented as follows.

In the above embodiment, the fuel pressure control is performed on the direct injection type engine 10. This may be applied to the port injection engine.

Although the pre-turbine exhaust gas pressure is estimated in the above embodiment, the pre-turbine exhaust gas pressure may be directly detected by providing an exhaust gas pressure sensor in the downstream side of the exhaust valve 52 and the upstream side of the exhaust turbine 32.

In the above embodiment, the present control is performed when the divided injection is performed during the period in which the catalyst warming-up operation is performed. In this regard, the present control may be performed not only when the divided injection is performed during the period in which the catalyst warming-up operation is performed, but also when the divided injection is performed in another operation state.

Further, the present control may be carried out not only in the case of carrying out the divided injection but also in a situation where the required injection amount becomes smaller than the high precision injection lower limit value. Specifically, this control may be performed when the engine 10 is in a predetermined low load operation state. As described above, even when the required injection amount is the same, since the fuel injection period changes in accordance with the fuel pressure of the fuel supplied to the in-cylinder injection valve 21, the high precision injection lower limit value also changes in accordance with the fuel pressure of the fuel supplied to the in-cylinder injection valve 21. In consideration of the above situation, the predetermined low load operation state is defined as the operation state of the internal combustion engine in which the required injection amount is equal to or less than the high precision injection lower limit value at the current fuel pressure of the fuel supplied to the in-cylinder injection valve 21. As a result, the predetermined low load operation state is defined by a state in which an error may occur in the fuel injection amount actually injected by the in-cylinder injection valve 21 relative to the required injection amount, and in such a state, the present fuel pressure control is performed, thereby being capable of reducing the error in the fuel injection amount.

In the above embodiment, the parameter enabling to estimate the internal EGR amount is set to the pre-turbine exhaust gas pressure. From the above viewpoint, a length of the valve overlap period during which both the intake valve 51 and the exhaust valve 52 are in the open state may be set as a parameter enabling to estimate the internal EGR amount. For example, when the intake valve 51 is quickly opened by controlling the intake side valve drive mechanism 51A, or when the exhaust valve 52 is slowly opened by controlling the exhaust side valve drive mechanism 52A, the valve overlap period becomes longer. Since the valve overlap period in which both the intake valve 51 and the exhaust valve 52 are in the open state becomes long, the amount of exhaust gas blown back to the intake side (internal EGR amount) becomes large. In other words, the internal EGR amount can be estimated from the length of the valve overlap period.

Since the combustion state of the combustible air-fuel mixture becomes better as the internal EGR amount is smaller, the fuel injection amount from the in-cylinder injection valve 21 is controlled to be smaller as the internal EGR amount is smaller. Therefore, in particular, when the divided injection is performed during the catalyst warming-up operation, there is a possibility that the required injection amount for the injection of a certain stage becomes smaller than the high precision injection lower limit value. In consideration of the above situation, in the above embodiment, the fuel pressure of the fuel supplied to the in-cylinder injection valve 21 is adjusted to the high-pressure pump 21B based on the internal EGR amount estimated from the pre-turbine exhaust gas pressure. From the above viewpoint, in an engine including an external EGR device in which a part of exhaust gas flows from the exhaust pipe 24 to the intake pipe 11, there is a relationship in which the combustion state of the combustible air-fuel mixture becomes better as the external EGR amount is also smaller. Therefore, in the engine including the external EGR device, the fuel pressure (injection rate) of the fuel supplied to the in-cylinder injection valve 21 may be adjusted to the high-pressure pump 21B based on a parameter enabling to estimate the external EGR amount in addition to or instead of the internal EGR amount.

The present disclosure has been described in accordance with the examples, it is understood that the present disclosure is not limited to such examples or structures. The present disclosure encompasses various modifications and variations within the scope of equivalents. In addition, various combinations and configurations, as well as other combinations and configurations that include only one element, more, or less, are within the scope and spirit of the present disclosure.

The invention claimed is:

1. A control device for an internal combustion engine, the internal combustion engine including a fuel injection valve, which is for injecting fuel to be burned in the internal combustion engine, and an injection rate adjuster, which is to adjust an injection rate of the fuel injected by the fuel injection valve, the control device comprising:
 a signal generator configured to generate a command signal, which is to cause the injection rate adjuster to adjust the injection rate, based on a parameter, which is for estimating an internal EGR amount of a part of exhaust gas remaining in a cylinder, the injection rate being a fuel injection amount per unit time; and
 an outputter configured to output the command signal, which is generated by the signal generator, to the injection rate adjuster; wherein
 the parameter is a downstream portion exhaust gas pressure, which is a pressure of the exhaust gas flowing in a downstream portion of an exhaust valve of the internal combustion engine,
 the signal generator is configured to generate the command signal to cause the injection rate adjuster to adjust the injection rate to be lower as the downstream portion exhaust gas pressure becomes lower when the internal combustion engine is in a low load operation state, and
 the low load operation state corresponds to an operation state of the internal combustion engine in which a required injection amount, which is a fuel injection amount required for the fuel injection valve, is equal to or less than a lower limit value of the required injection amount at which the fuel injection valve is enabled to control a fuel injection amount with a higher accuracy than a predetermined accuracy at a current pressure of the fuel supplied to the fuel injection valve.

2. The control device according to claim 1, further comprising:
 a fuel injection controller configured to cause the fuel injection valve to perform divided injection in which a required injection amount of the fuel, which is to be injected into one cylinder during one combustion cycle period, is divided into a plurality of amounts for a plurality of fuel injections, respectively and in which the fuel injections are made; wherein
 the signal generator is configured to generate the command signal to cause the injection rate adjuster to adjust the injection rate to be lower as the downstream portion exhaust gas pressure is lower when the fuel injection controller performs the divided injection.

3. The control device according to claim 2, wherein
 the internal combustion engine is provided with a catalyst device to purify the exhaust gas,
 the control device further comprising:
 a catalyst warming-up controller configured to perform a catalyst warming-up control to increase a temperature of the exhaust gas on condition that a temperature of the catalyst device does not reach a catalyst activation temperature, wherein
 the fuel injection controller is configured to perform the divided injection when the catalyst warming-up controller performs the catalyst warming-up control.

4. The control device according to claim 1, wherein
the internal combustion engine includes a supercharger to supercharge an intake air.

5. The control device according to claim 4, wherein
the internal combustion engine includes a catalyst device to purify the exhaust gas downstream of the supercharger, and
the control device further comprising:
a pressure loss calculator configured to calculate a pressure loss of the exhaust gas caused when passing through the catalyst device;
a downstream exhaust gas pressure calculator configured to calculate a supercharger downstream exhaust gas pressure, which is a pressure of the exhaust gas flowing downstream of the supercharger and upstream of the catalyst device, based on a sum of an absolute value of the pressure loss, which is calculated by the pressure loss calculator, and an atmospheric pressure;
a pressure ratio setter configured to set a pressure ratio of a pressure of the exhaust gas, which flows downstream of the exhaust valve in the internal combustion engine and upstream of the supercharger, to the supercharger downstream exhaust gas pressure based on a flow rate of the exhaust gas flowing in the supercharger; and
a downstream portion exhaust gas pressure calculator configured to calculate, as the downstream portion exhaust gas pressure, a pressure of the exhaust gas, which flows in the downstream of the exhaust valve of the internal combustion engine and in the upstream of the supercharger, based on the pressure ratio set by the pressure ratio setter and the supercharger downstream exhaust gas pressure calculated by the downstream exhaust gas pressure calculator.

6. The control device according to claim 1, wherein
the injection rate adjuster is a fuel pressure adjuster configured to adjust the pressure of the fuel to be supplied to the fuel injection valve.

7. The control device according to claim 1, wherein
the internal combustion engine is of a direct injection type in which the fuel is directly injected from the fuel injection valve into a combustion chamber of the internal combustion engine.

8. A control device for an internal combustion engine, the control device comprising:
a memory; and
at least one processor coupled to the memory and configured to perform:
acquiring a parameter, which is for estimating an internal EGR amount of a part of exhaust gas, which remains in a cylinder; and
generating a command signal based on the parameter to cause adjustment of an injection rate of fuel injected by a fuel injection valve, wherein the injection rate is a fuel injection amount per unit time; wherein
the parameter is a downstream portion exhaust gas pressure, which is a pressure of the exhaust gas flowing in a downstream portion of an exhaust valve of the internal combustion engine,
the at least one processor is further configured to generate the command signal to cause to adjust the injection rate to be lower as the downstream portion exhaust gas pressure becomes lower when the internal combustion engine is in a low load operation state, and
the low load operation state corresponds to an operation state of the internal combustion engine in which a required injection amount, which is a fuel injection amount required for the fuel injection valve, is equal to or less than a lower limit value of the required injection amount at which the fuel injection valve is enabled to control a fuel injection amount with a higher accuracy than a predetermined accuracy at a current pressure of the fuel supplied to the fuel injection valve.

9. The control device according to claim 8, wherein
the at least one processor is configured to further perform:
acquiring, as the parameter, a downstream portion exhaust gas pressure, which is a pressure of exhaust gas flowing in a downstream portion of an exhaust valve of the internal combustion engine; and
reducing a fuel pressure of the fuel supplied to the fuel injection valve to reduce an injection rate, as the downstream portion exhaust gas pressure is lower.

10. A method for controlling an internal combustion engine, the method comprising:
acquiring a parameter, which is for estimating an internal EGR amount of a part of exhaust gas, which remains in a cylinder; and
generating a command signal based on the parameter to cause adjustment of an injection rate of fuel injected by a fuel injection valve, wherein the injection rate is a fuel injection amount per unit time; wherein
the parameter is a downstream portion exhaust gas pressure, which is a pressure of the exhaust gas flowing in a downstream portion of an exhaust valve of the internal combustion engine,
the method further comprises adjusting the injection rate to be lower as the downstream portion exhaust gas pressure becomes lower when the internal combustion engine is in a low load operation state, and
the low load operation state corresponds to an operation state of the internal combustion engine in which a required injection amount, which is a fuel injection amount required for the fuel injection valve, is equal to or less than a lower limit value of the required injection amount at which the fuel injection valve is enabled to control a fuel injection amount with a higher accuracy than a predetermined accuracy at a current pressure of the fuel supplied to the fuel injection valve.

11. The control device according to claim 1, wherein
the internal combustion engine includes an intake valve and an exhaust valve; and
a length of valve overlap period during which both the intake valve and the exhaust valve are open is set as the parameter for estimating the internal EGR amount.

12. The control device according to claim 1, further comprising:
a first estimator configured to estimate, as the parameter, the downstream portion exhaust gas pressure.

13. The control device according to claim 12, further comprising:
a second estimator configured to estimate the internal EGR amount based on the downstream portion exhaust gas pressure estimated by the first estimator.

14. The control device according to claim 13, wherein
the signal generator is configured generate the command signal to cause the injection rate adjuster to adjust the injection rate to be lower to increase a fuel injection period, in which the fuel injection valve is caused to inject fuel, in response to a state where the internal EGR amount estimated from the parameter becomes small to reduce the fuel injection period such that a linear characteristic between the fuel injection period and the fuel injection amount is not established.

15. The control device according to claim 13, wherein
the signal generator is configured to generate the command signal to cause the injection rate adjuster to adjust the injection rate to be lower, as the internal EGR rate estimated by the second estimator decreases.

16. The control device according to claim 15, wherein
the signal generator is configured to generate the command signal to cause the injection rate adjuster to adjust the injection rate to be lower, as a load of the internal combustion engine decreases.

17. The control device according to claim 1, wherein
when the required injection amount is equal to or less than the lower limit value, to disable the fuel injection valve to control the fuel injection amount with the higher accuracy than the predetermined accuracy, a linear characteristic between a fuel injection period, in which the fuel injection valve is caused to inject fuel, and the fuel injection amount is not established, and an error occurs in the fuel injection amount.

18. The control device according to claim 1, further comprising:
a determiner configured to determine whether the required fuel injection amount is equal to or less than the lower limit value, wherein
the injection rate adjuster is a fuel pressure adjuster configured to adjust the pressure of the fuel to be supplied to the fuel injection valve to be lower, in response to determination of the determiner that the required fuel injection amount is equal to or less than the lower limit value.

* * * * *